(12) United States Patent
Monikandan

(10) Patent No.: US 8,767,020 B1
(45) Date of Patent: Jul. 1, 2014

(54) CONTENT REPRESENTATION SHARING ACROSS APPLICATIONS

(75) Inventor: S. Monikandan, Karnataka (IN)

(73) Assignee: Adobe Systems Incorporated, San Jose, CA (US)

( * ) Notice: Subject to any disclaimer, the term of this patent is extended or adjusted under 35 U.S.C. 154(b) by 1439 days.

(21) Appl. No.: 12/186,758

(22) Filed: Aug. 6, 2008

(51) Int. Cl.
*G09G 5/00* (2006.01)
(52) U.S. Cl.
USPC ........... 345/663; 345/676; 345/677; 345/678; 345/440; 345/440.1; 345/440.2; 345/441; 345/442; 715/708; 715/769; 715/788
(58) Field of Classification Search
CPC ............ G06F 3/04845; G06F 3/04855; G06F 3/04812
USPC ......... 345/700, 781, 663, 676, 677, 678, 440, 345/440.1, 440.2, 441, 442; 715/708–712, 715/788, 838, 769, 810
See application file for complete search history.

(56) References Cited

U.S. PATENT DOCUMENTS

| | | | | |
|---|---|---|---|---|
| 5,408,659 A * | 4/1995 | Cavendish et al. | ........... | 717/107 |
| 5,590,264 A * | 12/1996 | Keane et al. | .................. | 715/838 |
| 6,002,402 A * | 12/1999 | Schacher | ...................... | 715/810 |
| 7,703,039 B2 * | 4/2010 | Agarwal | ....................... | 715/788 |
| 2003/0048286 A1 * | 3/2003 | Lal | ................................ | 345/700 |
| 2004/0066414 A1 * | 4/2004 | Czerwinski et al. | .......... | 345/781 |
| 2004/0268260 A1 * | 12/2004 | Rockey et al. | ................ | 715/708 |
| 2005/0010871 A1 * | 1/2005 | Ruthfield et al. | ............. | 715/712 |
| 2006/0080432 A1 * | 4/2006 | Spataro et al. | ................ | 709/224 |
| 2007/0006089 A1 * | 1/2007 | Bales et al. | ................... | 715/769 |
| 2008/0073936 A1 * | 3/2008 | Jeng | ........................... | 296/180.1 |

* cited by examiner

*Primary Examiner* — Jin-Cheng Wang
(74) *Attorney, Agent, or Firm* — Kilpatrick Townsend Stockton LLP

(57) ABSTRACT

Methods and apparatus provide for a moderator that defines an editing space providing access to multiple applications. The moderator associates a first portion of the editing space with a first application and aligns the editing space over a work area of the first application. The moderator creates first content with the first application through the first portion of the editing space, such that the first content is bounded according to the dimension of the first portion of the editing space. The moderator further associates a second portion of the editing space with a second application. The moderator aligns the editing space over a work area of the second application. The moderator creates second content in the second application through the second portion of the editing space as the editing space displays the representation of the saved first content in the first portion of the editing space.

21 Claims, 14 Drawing Sheets

CONTENT REPRESENTATION SHARING ACROSS APPLICATIONS

BACKGROUND

Design applications are a subclass of application software used for graphic design, multimedia development, specialized image development, general image editing, or simply to access graphic files. Conventional design applications utilize either raster or vector graphic reading and editing methods to create, edit, and view digital media (e.g. animations, graphics, images, designs, media objects, etc.). Many conventional design applications, such as graphics programs, focus exclusively on either vector or raster graphics, but there are a few that combine them. Most graphics programs have the ability to import and export one or more graphics file formats. Several graphics programs support animation, or digital video. Vector graphics animation can be described as a series of mathematical transformations that are applied in sequence to one or more shapes in a scene. Raster graphics animation works in a similar fashion to film-based animation, where a series of still images produces the illusion of continuous movement.

BRIEF DESCRIPTION

Current conventional design applications suffer from a variety of deficiencies. Specifically, conventional design applications have a work area (i.e. a canvas) and each design application has tools and features well-suited for providing a solution in the workflow of designing a media object. For example, some conventional design applications are well-suited for editing digital images, whereas others are best for creating vector art. Various conventional design applications are geared towards creating and adding animations to media objects while some are best used for bitmap/vector editing for web images.

A user might want to design a media object, such as, for example, a web page, using the features and tools to create content for the web page with multiple conventional design applications. One conventional design application can be used to design a logo at the top of the web page, another conventional design application can be used to put an image at the center of the web page, and yet another conventional design application can be used to create a menu for the web page.

When the user creates the logo, image and menu for the web page using the various conventional design applications, the user must import and export documents across applications—which can result in a loss of data since the logo, image and menu are formatted differently via their application of origin. Also, the user cannot design various parts of the web page at the same time.

Techniques discussed herein significantly overcome the deficiencies of conventional applications such as those discussed above. As will be discussed further, certain specific embodiments herein are directed to a moderator that shares representations of content across applications without importing and exporting files from such applications.

The moderator displays an editing space through which the user can access the work areas of multiple applications. The moderator also displays a menu having application icons for each application, such as, for example, Adobe Photoshop®, Adobe Illustrator®, Adobe Flash® and Adobe Fireworks®. The moderator presents both the editing space and the menu over any application currently in view. As the user switches between applications to create various types of content, the moderator aligns the editing space over the work area of whichever application is currently selected by the user.

For example, a user may wish to create a media object, such as a web page, that includes a web page graphic created with one application, such as Adobe Illustrator, and an enhanced digital image created with another application, such as Adobe Photoshop. The user selects and opens (i.e. runs, launches, activates, etc.) Illustrator and Photoshop and launches the moderator. The moderator detects each application and creates an icon for Illustrator and an icon for Photoshop. The moderator displays each icon within a menu. The moderator displays the menu proximate to an editing space.

The moderator detects a user selection of the Illustrator icon from the menu and provides the user with a view of (i.e. maximizes) Illustrator's user interface. However, the moderator aligns the editing space over Illustrator's work area—such that the editing space blocks the user's view of Illustrator's work area.

In order to access Illustrator's work area "behind" the editing space so the user can interact with Illustrator's functionality (i.e. tools, actions, features, etc.) to create content in Illustrator's work area, the moderator allows the user to define a portion of the editing space to be associated with Illustrator. In other words, by associating a portion of the editing space with the Illustrator, conceptually, the moderator allows the user to "punch a hole" through the editing space, thereby revealing a part of Illustrator's working area "underneath" that portion of the editing space.

The moderator allows the user to create content, such as the web page graphic, through the portion of the editing space associated with Illustrator. In other words, from the user's perspective, it will appear to the user as though the user is creating content on the editing space. However, since the user will be working within the portion of the editing space associated with Illustrator—which provides access to a part of Illustrator's work area beneath the associated portion—the user's actions (such as input actions, mouse actions, etc.) will actually occur on that part of Illustrator's work area beneath the associated portion. Thus, the part of the Illustrator's work area that the user has contact with (or works in) will have the same dimensional and positional characteristics as the associated portion of the editing space.

When the user is done creating the web page graphic with Illustrator through the associated portion of the editing space, the moderator allows the user to save the web page graphic. Additionally, the moderator creates a file in Illustrator's format that describes the saved web page graphic. The file describes the web page graphic as having the same dimensional and positional characteristics as the associated portion of the editing space. Upon saving the web page graphic, the moderator creates a snapshot of the web page graphic (i.e. a representation of the content) and displays the snapshot of the web page graphic in the portion of the editing space associated with Illustrator.

Next, the moderator detects a user selection of the Photoshop icon from the menu. The moderator provides the user with a view of Photoshop's user interface. The moderator aligns the editing space over Photoshop's work area. Additionally, in order to provide the user with a visual reminder of the web page graphic created with Illustrator, the snapshot of the web page graphic is presented in the portion of the editing space that was previously associated with Illustrator—while the editing space is aligned over Photoshop's work area.

In order to access Photoshop's work area "behind" the editing space, the moderator allows the user to define a second portion of the editing space to be associated with Photoshop. Again, conceptually, by associating the second portion of the editing space with Photoshop, the moderator allows the user to "punch another hole" through the editing space to access a part of Photoshop's work area "underneath" the associated second portion of the editing space. The moderator allows the user to create content, such as the enhanced digital image, through the second portion of the editing space associated with Photoshop. Thus, the part of Photoshop's work area that the user has contact with (or works in) will have the same dimensional and positional characteristics as the associated second portion of the editing space. In addition, since the snapshot of the web page graphic (created in Illustrator) is displayed in the portion of the editing space associated with Illustrator, the moderator provides the user with a view of the web page graphic as the user creates the enhanced digital image with Illustrator—without requiring the user to import or export any files formatted by Illustrator.

When the user is done creating the enhanced digital image in Photoshop through the second portion of the editing space associated with Photoshop, the moderator allows the user to save the enhanced digital image. The moderator creates a file in Photoshop's format that describes the saved enhanced digital image. The file describes the enhanced digital image as having the same dimensional and positional characteristics as the associated second portion of the editing space. Upon saving the enhanced digital image, the moderator creates a snapshot of the enhanced digital image (i.e. a representation of the content) and displays the snapshot in the associated second portion of the editing space along with the display of the web page graphic snapshot in the portion of the editing space associated with Illustrator.

Thus, without requiring the user to export and import files across multiple applications to view recently created content, the editing space provides snapshots of both the web page graphic and enhanced digital image. Further, the moderator displays the web page graphic snapshot at a position that corresponds with the portion of the editing space associated with Illustrator and displays the enhanced digital image at a position that corresponds with the second portion of the editing space associated with Photoshop. The moderator thereby provides the user with a preview of how the web page graphic snapshot and enhanced digital image will be appear together on a web page at their respective locations.

If the moderator detects that the user selects (e.g. clicks on) the snapshot of the web page graphic, the moderator will again provide the user with a view of Illustrator's user interface and realign the editing space over Illustrator's work area. The moderator loads the saved web page graphic into Illustrator's work area "under" the portion of the editing space that was previously associated with Illustrator. By detecting the user selection of the web page graphic's snapshot, the moderator "activates" Illustrator and replaces the view of the web page graphic snapshot in the editing space with a view of the actual web page graphic loaded in Illustrator's work area. The moderator thereby allows the user to further modify the web page graphic with Illustrator while the snapshot of the enhanced digital image is displayed in the second portion of the editing space associated with Photoshop.

The moderator further creates a folder containing the formatted files for both the web page graphic and the enhanced digital image. In addition, the moderator includes another file that describes how both the web page graphic and the enhanced digital image are positioned relative to each other—based on the dimensions and positions of the portion of the editing space associated with Illustrator and the second portion of the editing space associated with Photoshop, respectively.

In various embodiments, the moderator creates snapshots of content before saving the content. For example, the moderator allows the user to switch from Illustrator to Photoshop before saving content created with Illustrator through the portion of the editing space associated with Illustrator. For example, upon creating content with Illustrator, the moderator allows the user to associate a second portion of the editing space with Photoshop. The moderator creates a snapshot of the content (i.e. representation of the content) created with Illustrator and displays the snapshot in the portion of the editing space associated with Illustrator.

The moderator aligns the editing space over Photoshop's work area and allows the user to create content with Photoshop through the second portion of the editing space associated with Photoshop. Upon detecting that the user has selected a "save" command, the moderator concurrently saves all the content created with Illustrator and Photoshop—separately creating a first file for the content created with Illustrator (formatted according to Illustrator) and a second file created with Photoshop (formatted according to Photoshop).

Specifically, in various embodiments, the moderator defines an editing space providing access to multiple applications. The moderator associates a first portion of the editing space with a first application from the multiple applications and aligns the editing space over a work area of the first application. The moderator creates first content with the first application through the first portion of the editing space, such that the first content is bounded according to the dimension of the first portion of the editing space.

The moderator further associates a second portion of the editing space with a second application from the multiple applications. While the editing space displays a representation of the saved first content within the first portion of the editing space, the moderator aligns the editing space over a work area of the second application. The moderator creates second content in the second application through the second portion of the editing space as the editing space displays the representation of the saved first content in the first portion of the editing space. The second content is bounded according to the dimension of the second portion of the editing space.

In another embodiment, the moderator allows a user to create first content with a first application through a first portion of the editing space associated with the first application. When the moderator detects that the user has selected an icon for a second application from the menu, the moderator automatically saves the first content as the moderator transitions to a display of the user interface of the second application. As the moderator aligns the editing space over the second application's work area in the second application's user interface, the moderator creates a file to store the first content according to the format of the first application. Further, the moderator creates a snapshot (i.e. a representation of content) of the first content and displays the snapshot of the first content at the first portion of the editing space—while the editing space is aligned over the second application's work area.

In yet another embodiment, while the editing space is aligned over a second application's work area, the moderator displays a snapshot (i.e. a representation of content) of saved first content created with a first application at a first portion of the editing space associated with the first application. The moderator allows the user to further associate that same first portion with the second application. The moderator thereby allows the user to create second content with the second application through the first portion of the editing space even though the first portion already displays the snapshot of the first content. Thus, the moderator creates second content that is meant to be overlayed upon (or combined with) the first content. However, the moderator saves the second content in a second file formatted according to the second application—which is separate from a first file of the saved first content that is formatted according to the first application.

The moderator creates a folder including the first file and the second file. The folder further includes a positional file describing that the first content and second content share similar dimensional and positional characteristics associated with first portion of the editing space, such that the second content is to be presented as overlayed upon (or combined with) the first content. Upon detecting that the user has selected (e.g. "clicked on") the positional file, the moderator opens the first and second files to present the second content overlayed upon (or combined with) the first content.

It is understood that while only two applications are herein discussed with regard to aspects of the moderator, it should be appreciated that the invention's aspects can involve any number of applications and is not limited to only two portions of the editing space respectively associated with only two applications.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium (e.g., tangible computer-readable medium) including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in software and hardware such as those manufactured by Adobe Systems Incorporated of San Jose, Calif., U.S.A., herein after referred to as "Adobe" and "Adobe Systems."

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note also that this Brief Description section herein does not specify every embodiment and/or incrementally novel aspect of the present disclosure or claimed invention. Instead, this Brief Description only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following more particular description of embodiments of the methods and apparatus for a moderator, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

DETAILED DESCRIPTION

Methods and apparatus provide for a moderator that defines an editing space providing access to multiple applications (i.e. any number of applications). The moderator associates a first portion of the editing space with a first application and aligns the editing space over a work area of the first application. The moderator creates first content with the first application through the first portion of the editing space, such that the first content (e.g. a graphic, a design, an image, an animation, a segment of a media object, etc.) is bounded according to the dimension of the first portion of the editing space. The moderator further associates a second portion of the editing space with a second application. The moderator aligns the editing space over a work area of the second application. The moderator creates second content (e.g. a graphic, a design, an image, an animation, a segment of a media object, etc.) in the second application through the second portion of the editing space as the editing space displays the representation of the saved first content in the first portion of the editing space.

Figure 1:
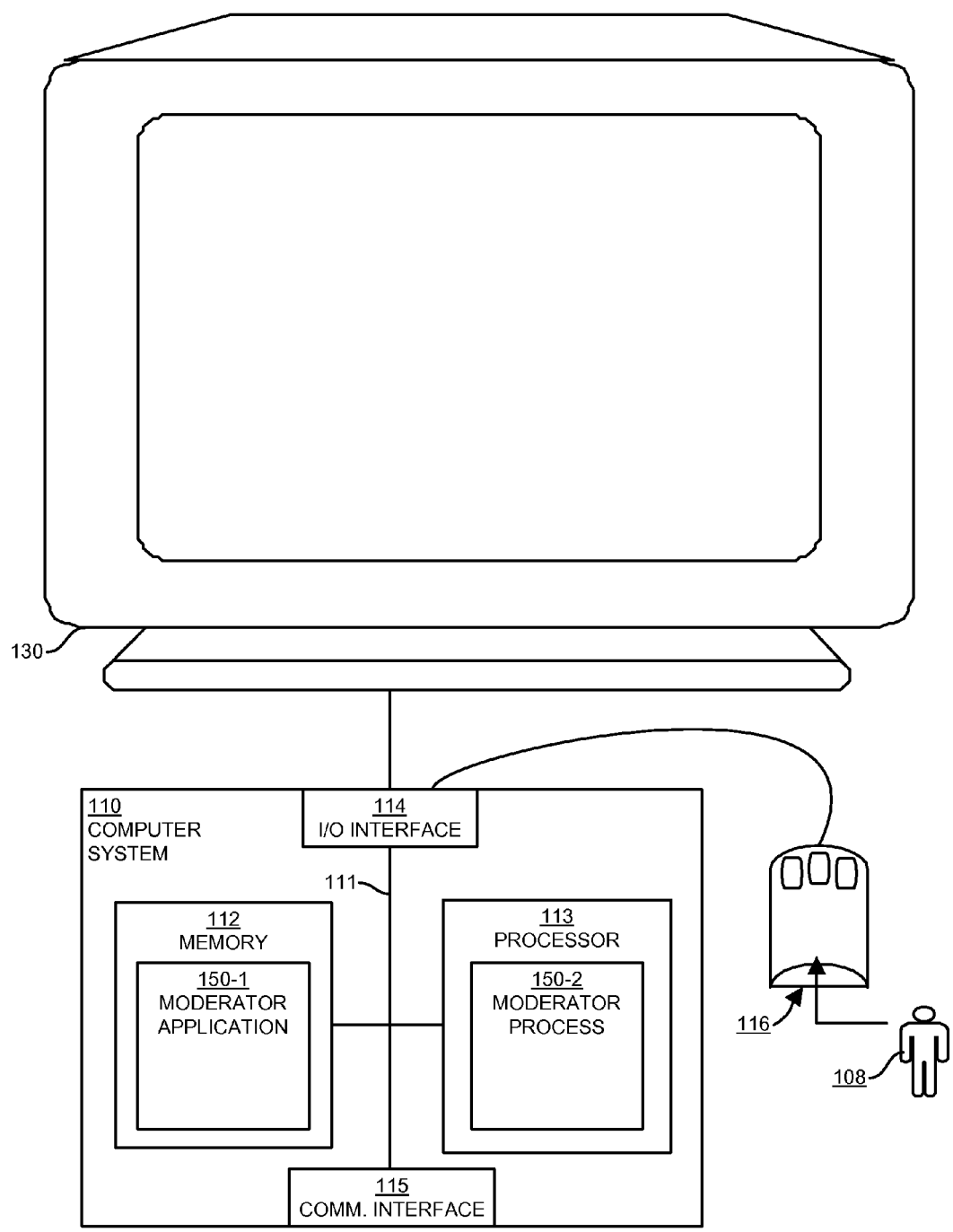
FIG. 1 is an example block diagram illustrating an architecture of a computer system that executes a moderator application and/or a moderator process according to embodiments herein.

FIG. 1 is an example block diagram illustrating an architecture of a computer system 110 that executes, runs, interprets, operates or otherwise performs a moderator application 150-1 and/or moderator process 150-2 (e.g. an executing version of a moderator 150 as controlled or configured by user 108) according to embodiments herein.

Note that the computer system 110 may be any type of computerized device such as a personal computer, a client computer system, workstation, portable computing device, console, laptop, network terminal, etc. This list is not exhaustive and is provided as an example of different possible embodiments.

In addition to a single computer embodiment, computer system 110 can include any number of computer systems in a network environment to carry the embodiments as described herein.

As shown in the present example, the computer system 110 includes an interconnection mechanism 111 such as a data bus, motherboard or other circuitry that couples a memory system 112, a processor 113, an input/output interface 114, and a display 130. If so configured, the display can be used to present a graphical user interface of the moderator 150 to user 108. An input device 116 (e.g., one or more user/developer controlled devices such as a keyboard, mouse, touch pad, etc.) couples to the computer system 110 and processor 113 through an input/output (I/O) interface 114. The computer system 110 can be a client system and/or a server system. As mentioned above, depending on the embodiment, the moderator application 150-1 and/or the moderator process 150-2 can be distributed and executed in multiple nodes in a computer network environment or performed locally on a single computer.

During operation of the computer system 110, the processor 113 accesses the memory system 112 via the interconnect 111 in order to launch, run, execute, interpret or otherwise perform the logic instructions of the moderator application 150-1. Execution of the moderator application 150-1 in this manner produces the moderator process 150-2. In other words, the moderator process 150-2 represents one or more portions or runtime instances of the moderator application 150-1 (or the entire application 150-1) performing or executing within or upon the processor 113 in the computerized device 110 at runtime.

The moderator application 150-1 may be stored on a computer readable medium (such as a floppy disk), hard disk, electronic, magnetic, optical, or other computer readable medium. It is understood that embodiments and techniques discussed herein are well suited for other applications as well.

Those skilled in the art will understand that the computer system 110 may include other processes and/or software and hardware components, such as an operating system. Display 130 need not be coupled directly to computer system 110. For example, the moderator application 150-1 can be executed on a remotely accessible computerized device via the communication interface 115.

Figure 2:
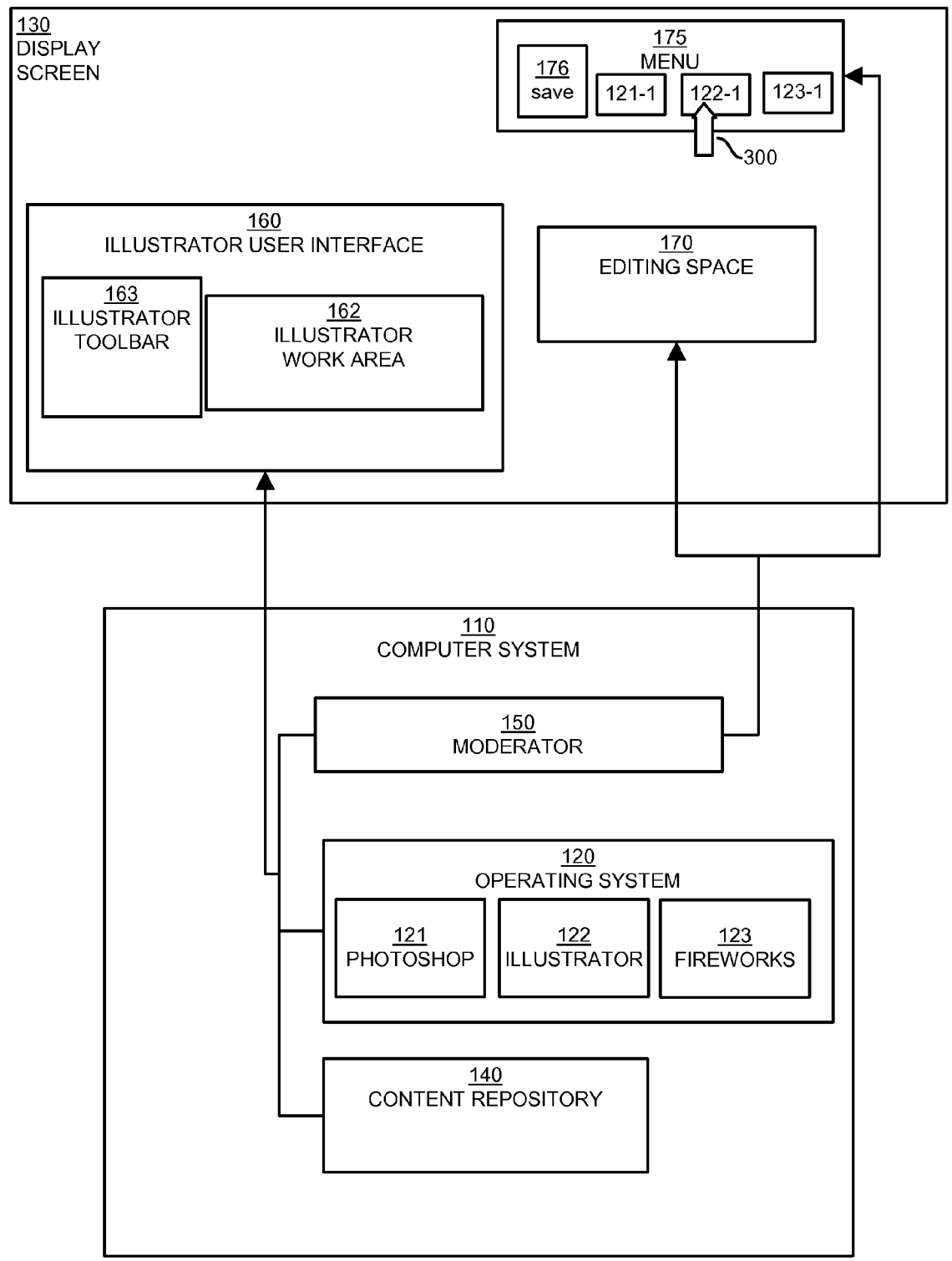
FIG. 2 is an example block diagram of a moderator detecting a user selection of an icon from a menu displayed proximate to an editing space according to embodiments herein.

Referring now to FIG. 2, FIG. 2 is an example block diagram of a moderator 150 detecting a user selection of an icon from a menu displayed proximate to an editing space according to embodiments herein.

The moderator 150 defines the editing space 170 to provide access to multiple applications 121, 122, 123 by detecting a selection of each of the multiple applications 121, 122, 123. For example, in one embodiment, a user can activate (i.e. open, launch, select, etc.) the multiple applications 121, 122, 123 to be run via the computer system's 110 operating system 120.

The moderator 150 detects each of the running multiple applications 121, 122, 123 and creates an icon 121-1, 122-1, 123-1 for each of the multiple applications 121, 122, 123. Each of the icons 121-1, 122-1, 123-1 are operable for activating a corresponding application. The moderator 150 creates a menu 175 presenting each icon 121-1, 122-1, 123-1 with an icon 176 for a save operation. The moderator 150 associates the menu 175 with the editing space 170 displays the menu 175 proximate to the editing space 170.

The moderator 150 detects a selection of a first icon 122-1 representing a first application—such as Adobe Illustrator—and the moderator 150 displays the editing space 170 contemporaneously with Illustrator's user interface 160. For example, in one embodiment, the user can "click" on an icon 122-1 that represents Adobe Illustrator with a pointer 300 operated via a computer input device such as a "mouse." Upon detecting the user's "click," the moderator 150 activates Illustrator and presents Illustrator's user interface 160 to the user in the display screen 132. Illustrator's user interface 160 includes a toolbar 163 that provides access to Illustrator's tools and features and a work area 162 in which the user can create content.

Figure 3:
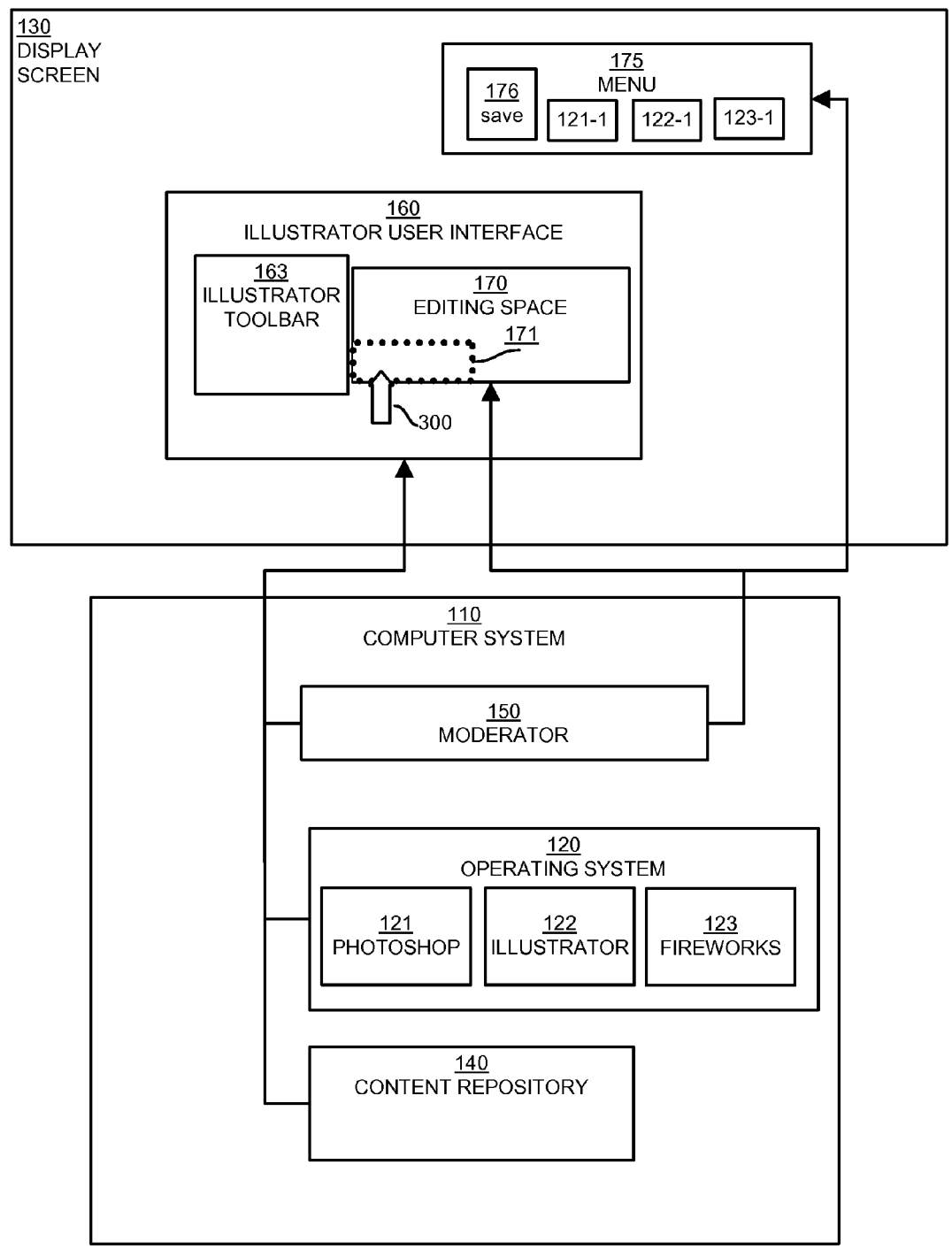
FIG. 3 is an example block diagram of a moderator aligning an editing space over a work area of a first application and allowing a user to associate a first portion of the editing space with the first application according to embodiments herein.

Turning now to FIG. 3, FIG. 3 is an example block diagram of a moderator 150 aligning an editing space over a work area of a first application and allowing a user to associate a first portion of the editing space with the first application according to embodiments herein.

The moderator 150 aligns the editing space 170 over Illustrator's work area 162. The user defines a portion 171 of the editing space 170 to be associated with Illustrator, such as, for example, drawing a rectangular shape in the editing space 170 with the pointer 300. By allowing the user to define the portion 171 of the editing space 170 to be associated with Illustrator, the moderator 150 defines the dimension of the first portion through which the user will have access to Illustrator's work area 162 behind the editing space 170. It is understood that the user can select (i.e. draw) any shape at any location in the editing space 170 to define a portion of the editing space 170 to be associated with Illustrator.

Figure 4:
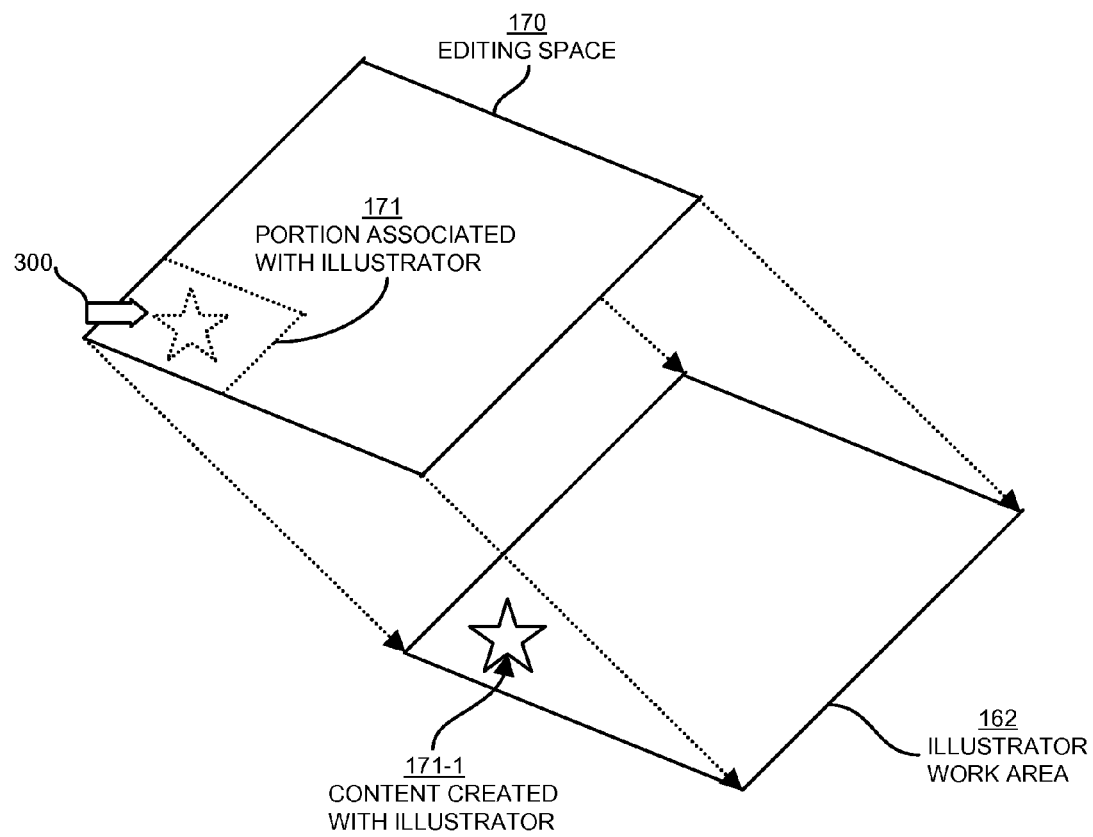
FIG. 4 is an example block diagram of a moderator creating content with a first application through a first portion of the editing space that is associated with the first application according to embodiments herein.

FIG. 4 is an example block diagram of a moderator 150 creating content with a first application through a first portion of the editing space that is associated with the first application according to embodiments herein.

As shown in FIG. 4, the user manipulates the pointer 300 within the portion 171 of the editing space 170 associated with Illustrator in order to create content 171-1 with Illustrator. However, although the user works within the portion 171 of the editing space 170 associated with Illustrator, the moderator 150 actually creates the content 171-1 with Illustrator in Illustrator's work area 162. Thus, conceptually, the portion 171 of the editing space 170 associated with Illustrator acts as a "hole" through which the moderator 150 allows the user access to a part of Illustrator's work area 162 that is beneath the associated portion 171. The content 171-1 created with Illustrator is thereby bounded according to a dimension of the portion 171 of the editing space 170.

Figure 5:
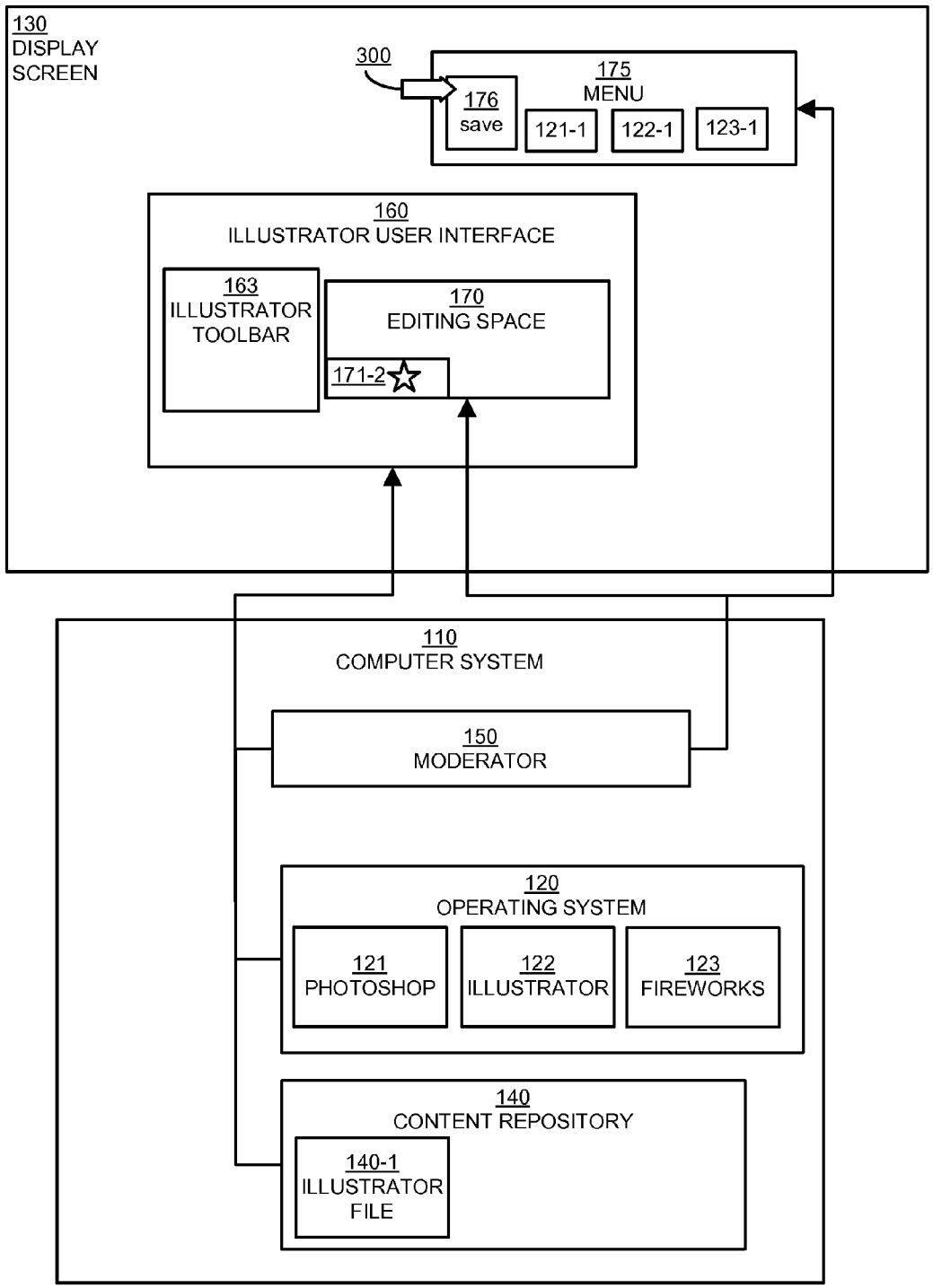
FIG. 5 is an example block diagram of a moderator saving content created with a first application and creating a representation of the content for display of the saved content in the editing space according to embodiments herein.

FIG. 5 is an example block diagram of a moderator 150 saving content created with a first application and creating a representation of the content for display of the saved content in the editing space according to embodiments herein.

As shown in FIG. 5, while the editing space 170 is aligned over Illustrator's work area 162, the moderator 150 detects that the user selects the "save" icon 176 with the pointer 300 and the moderator 150 saves the content 171-1 created with Illustrator to generate a file 140-1 in Illustrator's format. The file describes the content 171-1 as bounded according to the dimension of the portion 171 of the editing space 170 associated with Illustrator. Thus, the file 140-1 describes positional characteristics of the content 171-1 based on where the user created the content 171-1 within the portion 171 of the editing space 170 associated with Illustrator. Upon saving the content 171-1, the moderator 150 creates a representation 171-2 (such as a snapshot) of the content 171-1 that was saved and displays the representation 171-2 of the content 171 in the portion 171 of the editing space 170 associated with Illustrator. Further, the moderator 150 stores the file 140-1 in a content repository 140.

Figure 6:
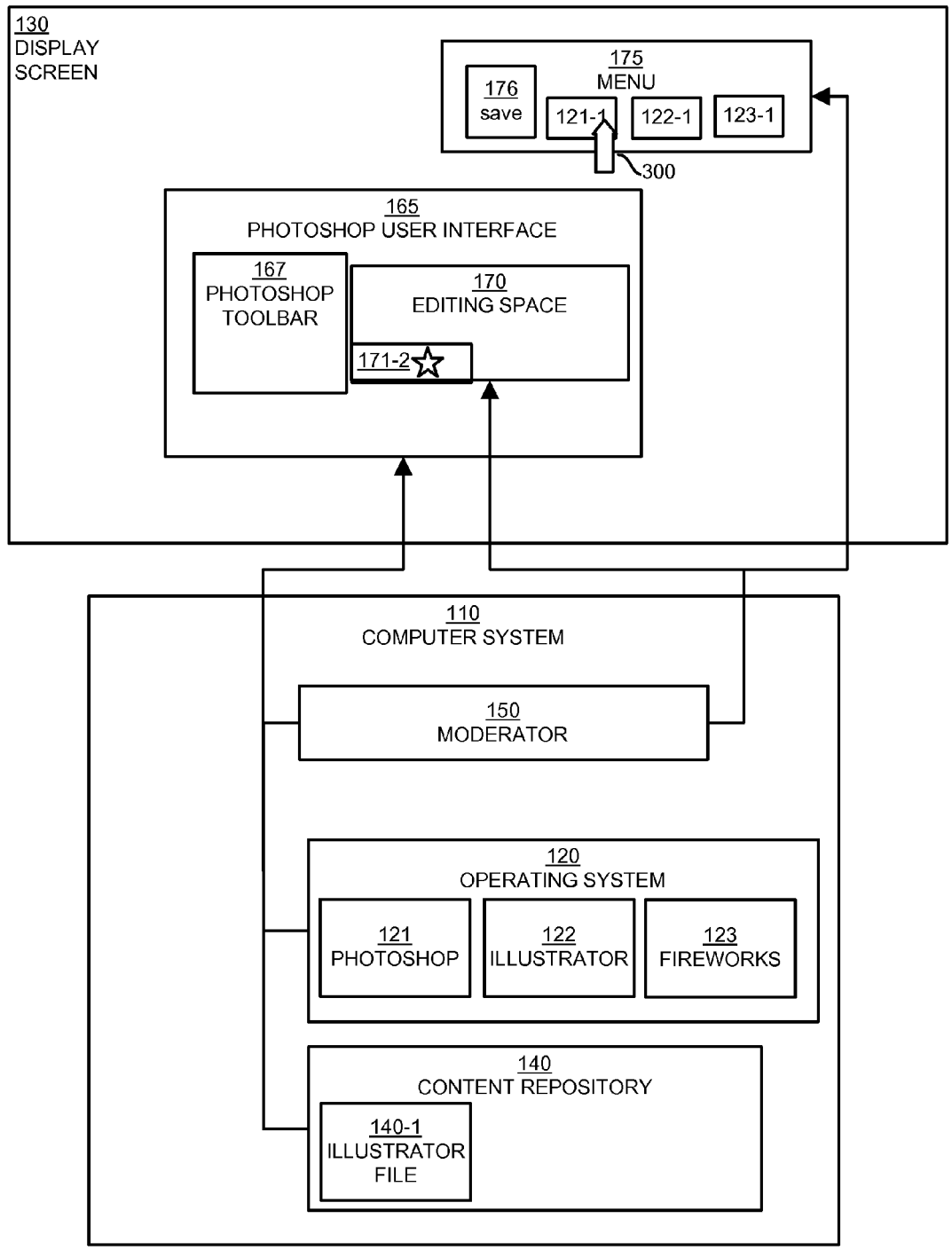
FIG. 6 is an example block diagram of a moderator detecting a user selection of an icon for a second application from a menu displayed proximate to an editing space that displays a representation of content created with a first application according to embodiments herein.

Turning now to FIG. 6, FIG. 6 is an example block diagram of a moderator 150 detecting a user selection of an icon for a second application from a menu displayed proximate to an editing space that displays a representation of content created with a first application according to embodiments herein.

Upon detecting the user's selection of a second icon 121-1 representing a second application—such as Adobe Photoshop, the moderator 150 minimizes Illustrator's user interface 160 and presents Photoshop's user interface 165 to the user in the display screen 132. Photoshop's user interface 165 includes a toolbar 167 that provides access to Photoshop's tools and features and a work area 166 (shown in FIG. 8) in which the user can create content. The moderator 150 displays the editing space 170 contemporaneously with Photoshop's user interface 165. The moderator 150 displays the snapshot 171-2 of content 171-1 created with Illustrator at the portion 171 of editing space 170 associated with Illustrator.

Figure 7:
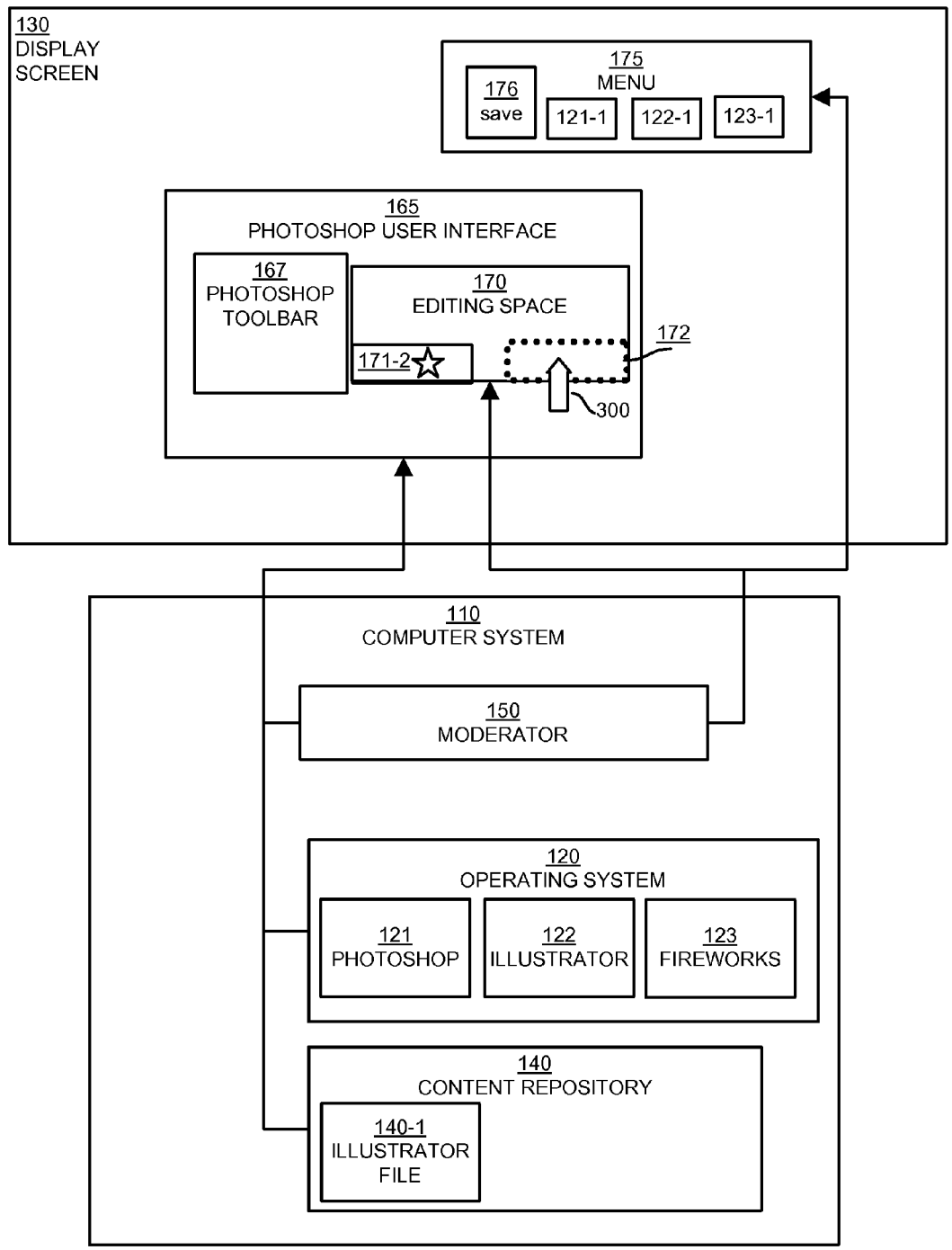
FIG. 7 is an example block diagram of a moderator aligning an editing space over a work area of a second application and allowing a user to associate a second portion of the editing space with the second application while the editing space displays a representation of content created with a first application according to embodiments herein.

Referring now to FIG. 7, the moderator 150 aligns the editing space 170 over Photoshop's work area 166 while the editing space displays the snapshot 171-2 of content 171-1 created with Illustrator. The user defines a portion 172 of the editing space 170 to be associated with Photoshop. By allowing the user to define the portion 172 of the editing space 170 to be associated with Photoshop, the moderator 150 defines the dimension of the portion 172 through which the user will have access to Photoshop's work area 166 behind the editing space 170.

It is understood that to align the editing space over an application's work area, the moderator searches a window hierarchy of the application for a window associated with a specific class name which declares how the window is supposed to behave. Thus, the moderator is aware of the work area class names for each of the multiple applications.

Upon identifying the application's work area window via its class name, the moderator embeds the editing space in the application's work area window. Hence, if the user moves the application's work area, the moderator's editing space will also move along with application's work area.

Figure 8:
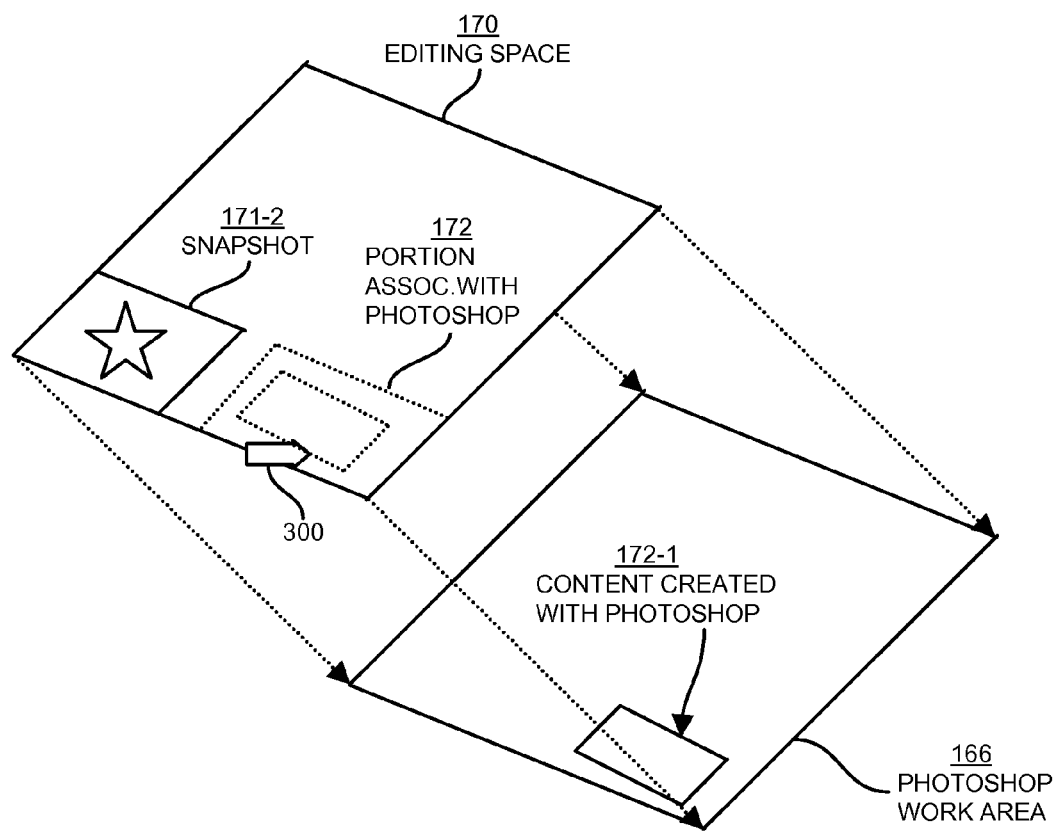
FIG. 8 is an example block diagram of a moderator creating content with a second application through a second portion of the editing space that is associated with the second application while the editing space displays a representation of content created with a first application according to embodiments herein.

FIG. 8 is an example block diagram of a moderator 150 creating content with a second application through a second portion of the editing space that is associated with the second application while the editing space displays a representation of content created with a first application according to embodiments herein.

In FIG. 8, as the moderator 150 displays the snapshot 171-2 in the portion 171 of the editing space 170 associated with Illustrator, the moderator 150 allows the user to manipulate the pointer 300 within the portion 172 of the editing space 170 associated with Photoshop in order to create content 172-1 with Photoshop, such as an edited digital image. However, although the user works within the portion 172 of the editing space 170 associated with Photoshop, the moderator 150 actually creates the content 172-1 with Photoshop—through the associated portion 172 but in Photoshop's work area 166. Thus, conceptually, the portion 172 of the editing space 170 associated with Photoshop acts as a "hole" through which the moderator 150 allows the user access to a part of Photoshop's work area 166 that is beneath the associated portion 172. The content 172-1 created with Photoshop is thereby bounded according to a dimension of the portion 172 of the editing space 170.

Figure 9:
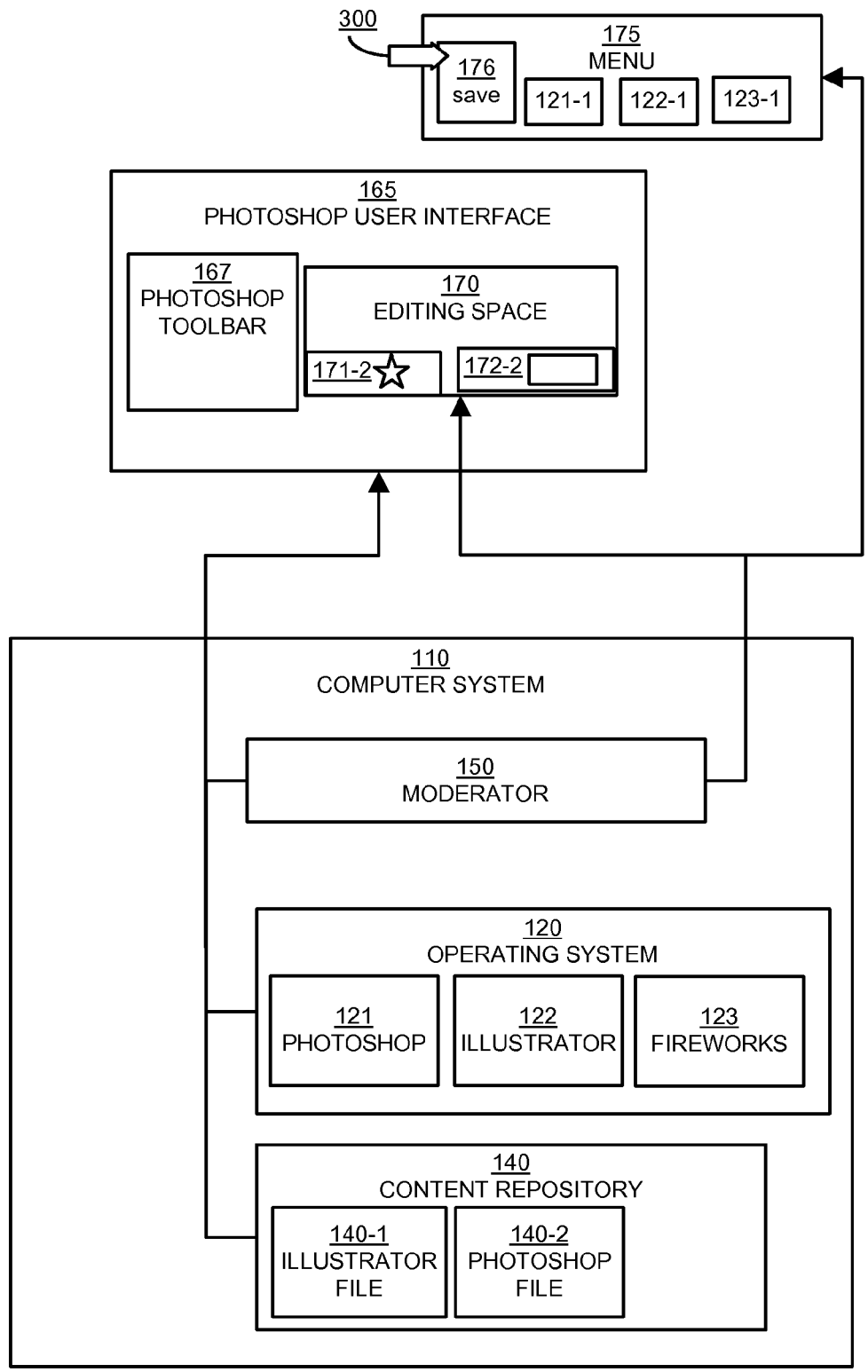
FIG. 9 is an example block diagram of a moderator saving content created with a second application and creating a representation of the content for display of the saved content in the editing space according to embodiments herein.

FIG. 9 is an example block diagram of a moderator 150 saving content created with a second application and creating a representation of the content for display of the saved content in the editing space according to embodiments herein.

As illustrated in FIG. 9, while the editing space 170 is aligned over Photoshop's work area 166 and displays the snapshot 172-1 in the editing space 170, the moderator 150 detects that the user selects the "save" icon 176 with the pointer 300 and the moderator 150 saves the content 172-1 created with Photoshop to generate a file 140-2 in Photoshop's format. The file describes the content 172-1 as bounded according to the dimension of the portion 172 of the editing space 170 associated with Photoshop.

Thus, the file 140-2 describes positional characteristics of the content 172-1 based on where the user created the content 172-1 within the portion 172 of the editing space 170 associated with Photoshop. Upon saving the content 172-1, the moderator 150 creates a representation 172-2 (such as a snapshot) of the content 172-1 that was saved and displays the representation 172-2 of the content 172-1 in the portion 172 of the editing space 170 associated with Photoshop. The moderator 150 displays the snapshot 172-2 concurrently with display of the snapshot 171-2 of content 171-1 created with Illustrator. Further, the moderator 150 stores the file 140-2 in the content repository 140.

FIG. 10 through FIG. 14 illustrate various embodiment of the moderator 150. The rectangular elements in flowcharts 1000, 1100, 1200, 1300 and 1400 denote "processing blocks" and represent computer software instructions or groups of instructions upon a computer readable medium. Additionally, the processing blocks represent steps performed by hardware such as a computer, digital signal processor circuit, application specific integrated circuit (ASIC), etc.

Flowcharts 1000, 1100, 1200, 1300 and 1400 do not necessarily depict the syntax of any particular programming language. Rather, flowcharts 1000, 1100, 1200, 1300 and 1400 illustrate the functional information one of ordinary skill in the art requires to fabricate circuits or to generate computer software to perform the processing required in accordance with the present invention.

It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 10:
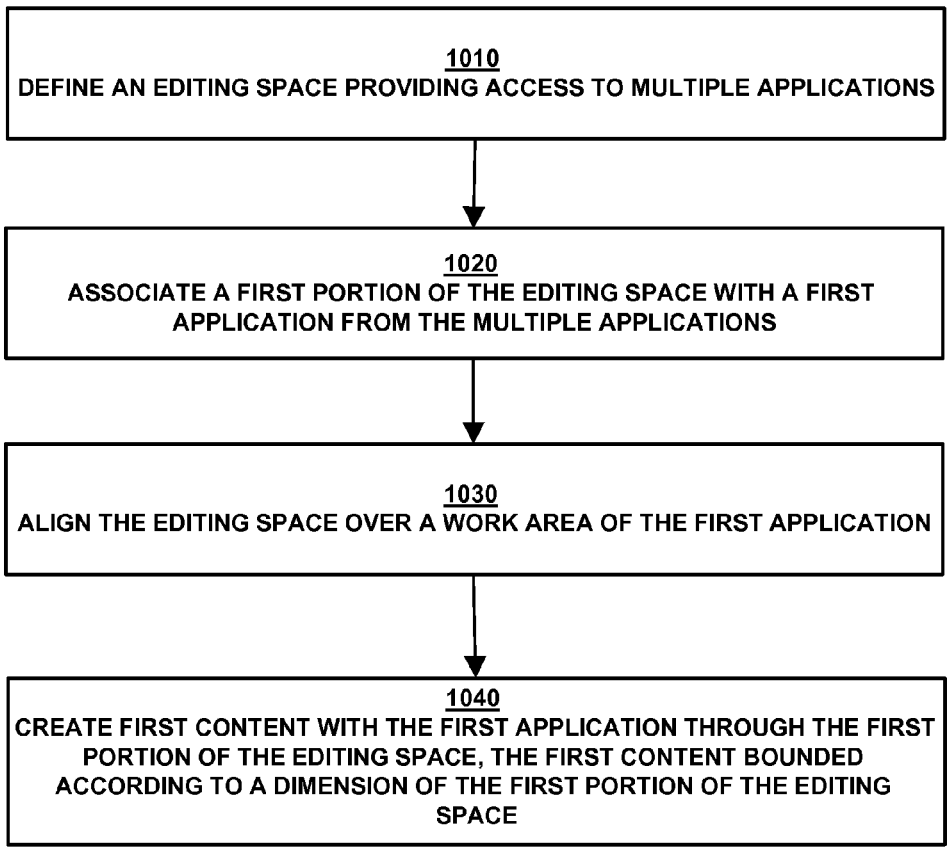
FIG. 10 is a flowchart of an example of processing steps performed by the moderator to create first content with a first application according to embodiments herein.

FIG. 10 is a flowchart 1000 of an example of processing steps performed by the moderator to create first content with a first application according to embodiments herein.

At step 1010, the moderator 150 defines an editing space providing access to multiple applications.

At step 1020, the moderator 150 associates a first portion of the editing space with a first application from the multiple applications.

At step 1030, the moderator 150 aligns the editing space over a work area of the first application.

At step 1040, the moderator 150 creates first content with the first application through the first portion of the editing space. The first content is bounded according to a dimension of the first portion of the editing space.

Figure 11:
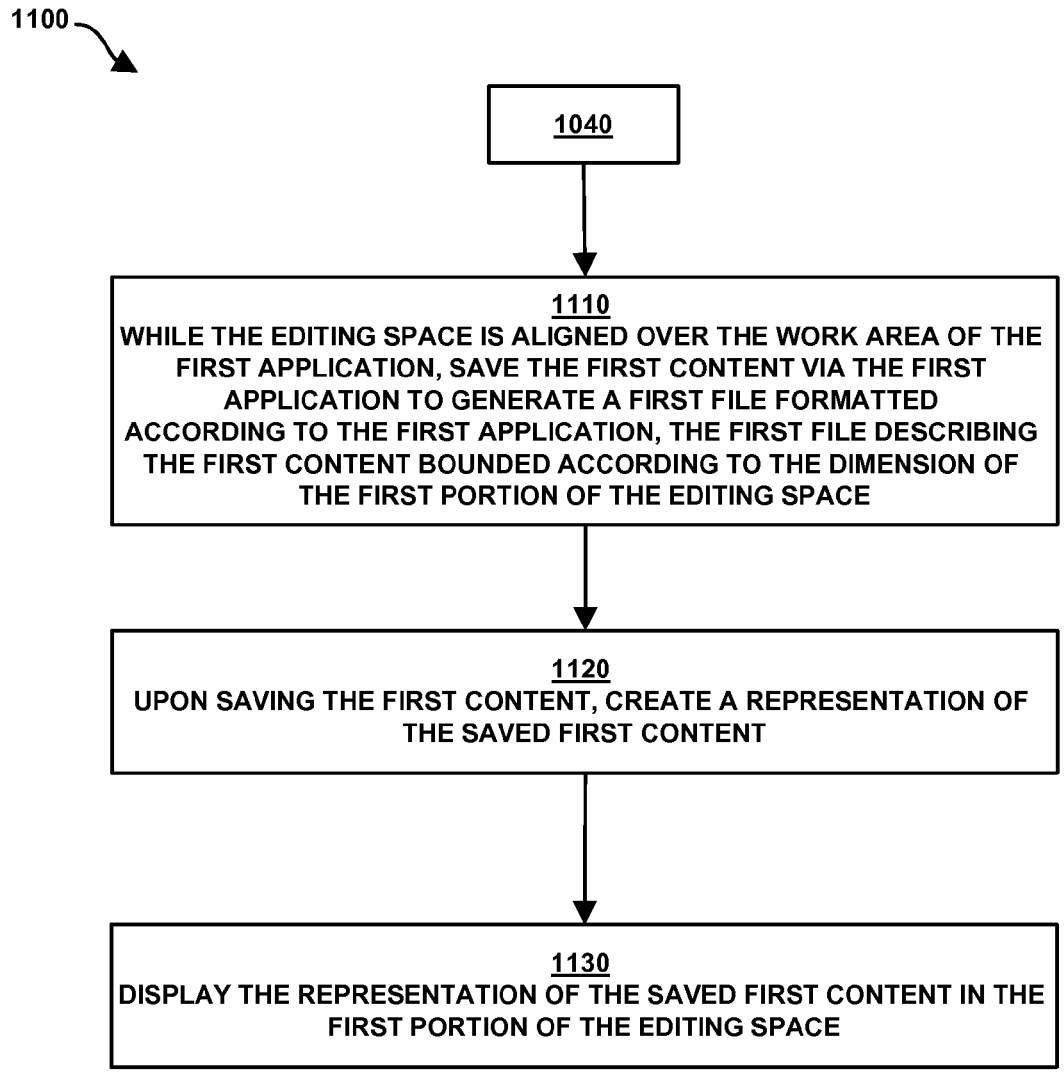
FIG. 11 is a flowchart 1100 of an example of processing steps performed by the moderator to create a representation of first content according to embodiments herein.

FIG. 11 is a flowchart 1100 of an example of processing steps performed by the moderator to create a representation of first content according to embodiments herein.

At step 1110, while the editing space is aligned over the work area of the first application, the moderator 150 saves the first content via the first application to generate a first file formatted according to the first application. The first file describes the first content bounded according to the dimension of the first portion of the editing space At step 1120, upon saving the first content, the moderator 150 creates a representation of the saved first content.

At step 1130, the moderator 150 displays the representation of the saved first content in the first portion of the editing space.

Figure 12:
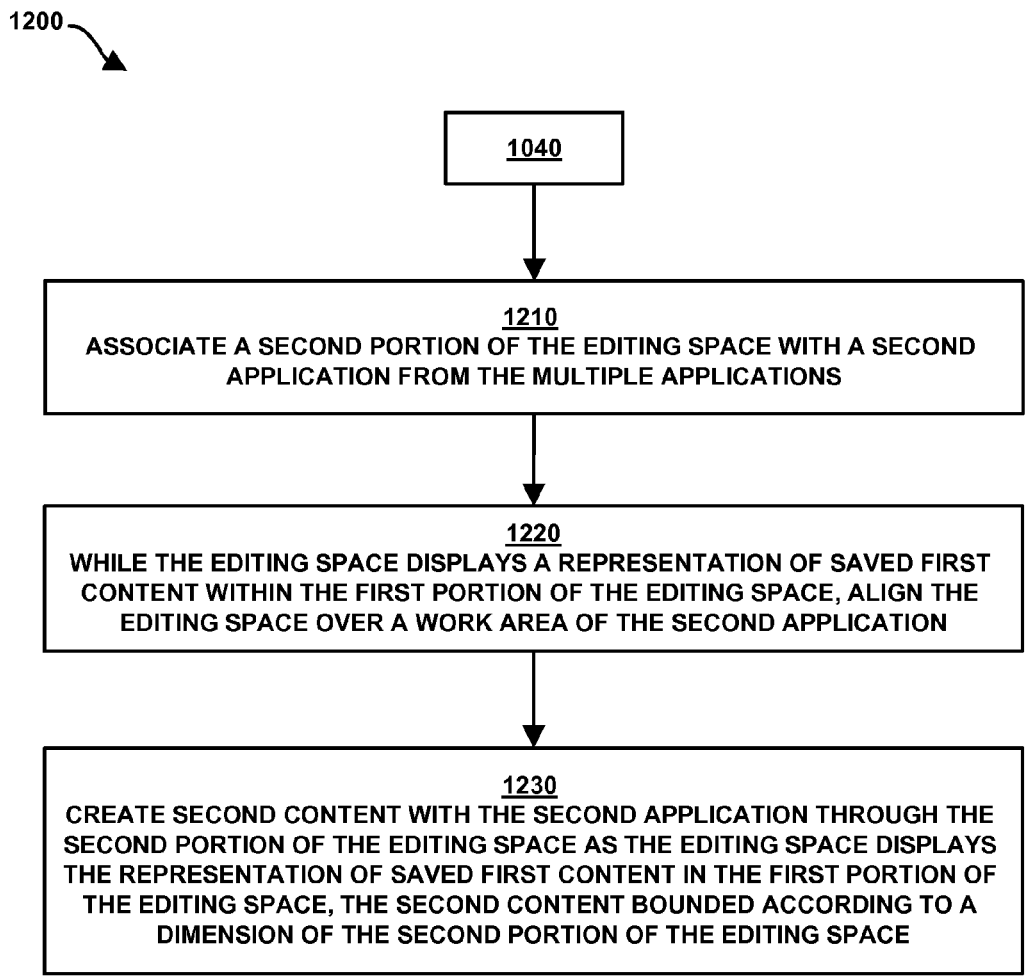
FIG. 12 is a flowchart 1200 of an example of processing steps performed by the moderator to create second content with a second application according to embodiments herein.

FIG. 12 is a flowchart 1200 of an example of processing steps performed by the moderator to create second content with a second application according to embodiments herein.

At step 1210, the moderator 150 associates a second portion of the editing space with a second application from the multiple applications.

At step 1220, while the editing space displays a representation of saved first content within the first portion of the editing space, the moderator 150 aligns the editing space over a work area of the second application.

At step 1230, the moderator 150 creates second content with the second application through the second portion of the editing space as the editing space displays the representation of saved first content in the first portion of the editing space. The second content is bounded according to a dimension of the second portion of the editing space.

In addition, while the editing space is aligned over the work area of the second application, the moderator 150 saves the second content via the second application to generate a second file formatted according to the second application. The second file describes the second content bounded according to the dimension of the second portion of the editing space.

Upon saving the second content, the moderator 150 creates a representation of the saved second content and concurrently displays the representation of the saved second content in the second portion of the editing space along with the representation of saved first content displayed within the first portion of the editing space.

Figure 13:
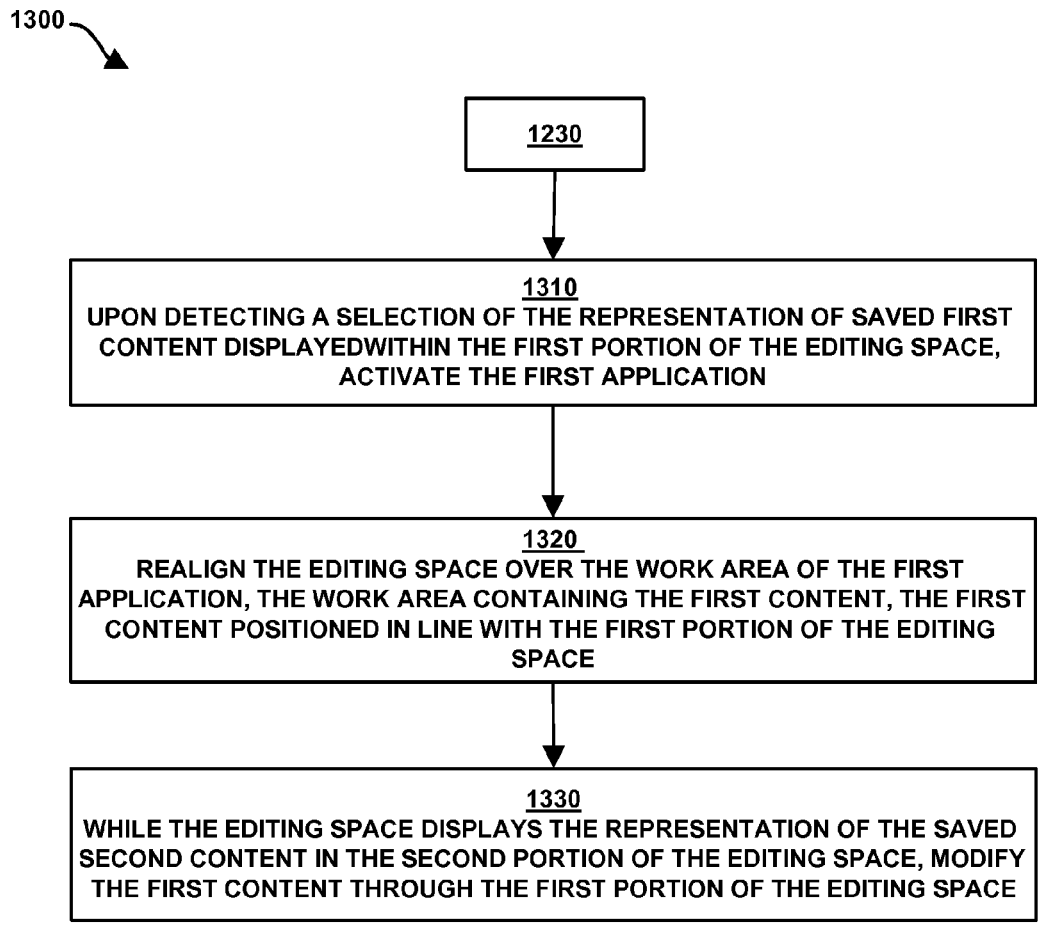
FIG. 13 is a flowchart 1300 of an example of processing steps performed by the moderator to activate a first application upon detecting a selection of a representation of first content displayed in an editing space to embodiments herein.

FIG. 13 is a flowchart 1300 of an example of processing steps performed by the moderator to activate a first application upon detecting a selection of a representation of first content displayed in an editing space to embodiments herein.

At step 1310, upon detecting a selection of the representation of saved first content displayed within the first portion of the editing space, the moderator 150 activates the first application.

At step 1320, the moderator 150 realigns the editing space over the work area of the first application, the work area containing the first content, the first content positioned in line with the first portion of the editing space.

At step 1330, while the editing space displays the representation of the saved second content in the second portion of the editing space, the moderator 150 modifies the first content through the first portion of the editing space.

Figure 14:
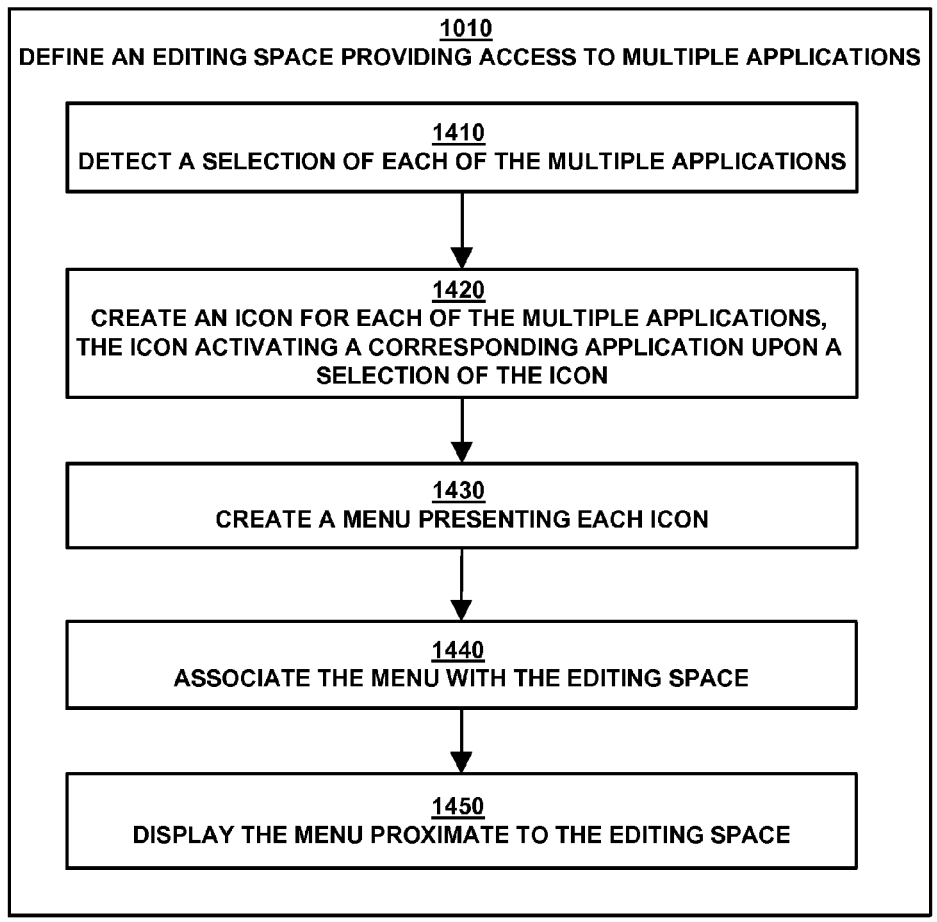
FIG. 14 is a flowchart 1400 of an example of processing steps performed by the moderator to define an editing space according to embodiments herein.

FIG. 14 is a flowchart 1400 of an example of processing steps performed by the moderator to define an editing space according to embodiments herein.

At step 1410, the moderator 150 detects a selection of each of the multiple applications.

At step 1420, the moderator 150 creates an icon for each of the multiple applications. Each icon is operable to activate a corresponding application upon a selection of the icon.

At step 1430, the moderator 150 creates a menu presenting each icon.

At step 1440, the moderator 150 associates the menu with the editing space.

At step 1450, the moderator 150 displays the menu proximate to the editing space.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer (s), workstation(s) (e.g., Sun, HP), personal digital assistant (s) (PDA(s)), handheld device(s) such as cellular telephone (s), laptop(s), handheld computer(s), or another device(s) capable of being integrated with a processor(s) that may operate as provided herein. Accordingly, the devices provided herein are not exhaustive and are provided for illustration and not limitation.

References to "a processor", or "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application.

References to a network, unless provided otherwise, may include one or more intranets and/or the internet, as well as a virtual network. References herein to microprocessor instructions or microprocessor-executable instructions, in accordance with the above, may be understood to include programmable hardware.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A non-transitory computer-readable medium comprising program code, the program code comprising:
    program code for displaying an editing space within a moderator application;
    program code for detecting a first application executing concurrently with the moderator application, the first application having a first workspace for editing content within the first application;
    program code for receiving a selection, within the moderator application, of the first application and for aligning the editing space over a first workspace of the first application;
    program code for receiving a selection of a first region within the editing space, and for displaying a portion of the first workspace within the first region;
    program code for receiving commands by the moderator application, the commands configured to edit first content within the first region, and for providing the commands to the first application;
    program code for generating a snapshot of the first content, and for displaying the snapshot in the first region; and
    program code for generating a document associated with the editing space, the document comprising information describing a location of the first region within the editing space and a first reference to the first content associated with the first region.

2. The non-transitory computer-readable medium of claim 1 further comprising:
    program code for detecting a second application executing concurrently with the moderator application, the second application having a second workspace for editing content within the second application;
    program code for receiving a selection, within the moderator application, of the second application;
    program code for receiving a selection of a second region within the editing space, and for displaying a portion of the second workspace within the second region;
    program code for receiving commands configured to edit second content within the second region, and for providing the commands to the second application;
    program code for generating a snapshot of the second content, and for displaying the snapshot in the second region; and
    wherein the document further comprises information describing a location of the second region within the editing space and a second reference to a second file comprising the second content.

3. The non-transitory computer-readable medium of claim 2 wherein the document comprises a webpage and the first file comprises an image file and the second file comprises a graphic.

4. The non-transitory computer-readable medium of claim 2 further comprises program code for displaying a first icon corresponding to the first application and a second icon corresponding to the second application.

5. The non-transitory computer-readable medium of claim 4 wherein the program code for receiving the selection of the first application or the second application comprises program code for detecting a selection of the first icon or the second icon.

6. The non-transitory computer-readable medium of claim 2 wherein the first and second regions are configured to allow editing of the first and second contents substantially simultaneously.

7. The non-transitory computer-readable medium of claim 1 wherein the document comprises a webpage and the first file comprises an image file.

8. The non-transitory computer-readable medium of claim 1 wherein the editing space is configured to obscure the first workspace and wherein the first region is configured to allow a corresponding portion of the first workspace to be unobscured.

9. The non-transitory computer-readable medium of claim 1 further comprising program code for receiving a save command, the save command configured to cause the first content to be saved in the first file and the document to be saved in a document file.

10. A method comprising:
displaying an editing space within a moderator application executed by one or more processors;
detecting, by the moderation application, a first application executing concurrently with the moderator application, the first application having a first workspace for editing content within the first application;
receiving a selection, by the moderator application, of the first application and for aligning the editing space over a first workspace of the first application;
receiving a selection, by the moderation application, of a first region within the editing space, and for displaying a portion of the first workspace within the first region;
receiving commands, by the moderation application, configured to edit first content within the first region and providing the commands to the first application;
generating, by the moderation application, a snapshot of the first content and displaying the snapshot in the first region; and
generating, by the moderation application, a document associated with the editing space, the document comprising information describing a location of the first region within the editing space and a first reference to the first content associated with the first region.

11. The method of claim 10 further comprising:
detecting, by the moderation application, a second application executing concurrently with the moderator application, the second application having a second workspace for editing content within the second application;
receiving a selection, by the moderator application, of the second application;
receiving, by the moderation application, a selection of a second region within the editing space, and for displaying a portion of the second workspace within the second region;
receiving, by the moderation application, commands configured to edit second content within the second region, and for providing the commands to the second application;
generating, by the moderation application, a snapshot of the second content, and for displaying the snapshot in the second region; and
wherein the document further comprises information describing a location of the second region within the editing space and a second reference to a second file comprising the second content.

12. The method of claim 11 wherein the document comprises a webpage and the first file comprises an image file and the second file comprises a graphic.

13. The method of claim 11 further comprises displaying, by the moderator application, a first icon corresponding to the first application and a second icon corresponding to the second application.

14. The method of claim 13 wherein receiving the selection of the first application or the second application comprises detecting a selection of the first icon or the second icon.

15. The method of claim 11 wherein the first and second regions are configured to allow editing of the first and second contents substantially simultaneously.

16. The method of claim 10 wherein the document comprises a webpage and the first file comprises an image file.

17. The method of claim 10 wherein the editing space obscures the first workspace and wherein the first region unobscures a corresponding portion of the first workspace.

18. The method of claim 10 further comprising receiving saving the first content in the first file and the document in a document file.

19. A system comprising:
a computer-readable medium;
a processor in communication with the computer-readable medium, the processor configured to execute a moderator application and a first application, the moderator application configured to:
display an editing space
detect the first application executing concurrently with the moderator application, the first application having a first workspace for editing content within the first application;
receive a selection of the first application and for aligning the editing space over a first workspace of the first application;
receive a selection of a first region within the editing space, and for displaying a portion of the first workspace within the first region;
receive commands configured to edit first content within the first region and providing the commands to the first application;
generate a snapshot of the first content and displaying the snapshot in the first region; and
generate a document associated with the editing space, the document comprising information describing a location of the first region within the editing space and a first reference to the first content associated with the first region.

20. The system of claim 19 wherein the document comprises a webpage and the first file comprises an image file.

21. The system of claim 19 wherein the processor is configured to obscure the first workspace and wherein the first region unobscures a corresponding portion of the first workspace.

* * * * *